United States Patent [19]

Tribble

[11] Patent Number: 4,516,701

[45] Date of Patent: May 14, 1985

[54] DISPENSER FOR PARTICULATE MATERIAL IN MEASURED QUANTITIES

[76] Inventor: Terry B. Tribble, Roberta, Ga. 31078

[21] Appl. No.: 578,292

[22] Filed: Feb. 8, 1984

Related U.S. Application Data

[63] Continuation of Ser. No. 310,608, Oct. 13, 1981, abandoned.

[51] Int. Cl.³ ............................................. G01F 11/10
[52] U.S. Cl. .................................... 222/361; 222/509
[58] Field of Search ............... 222/361, 366, 336, 509,
222/505, 344, 362, 363, 424.5, 441; 221/264,
263, 281

[56] References Cited

U.S. PATENT DOCUMENTS

| | | | |
|---|---|---|---|
| 1,708,130 | 4/1929 | Guest | 222/361 |
| 1,808,029 | 6/1931 | Frame | 222/509 |
| 1,945,849 | 2/1934 | Ferrandino | 222/360 |
| 2,398,727 | 4/1946 | Softis | 222/361 |
| 3,276,637 | 10/1966 | Fender | 222/361 |

Primary Examiner—Joseph J. Rolla
Assistant Examiner—Kenneth Noland
Attorney, Agent, or Firm—Patrick F. Henry

[57] ABSTRACT

A three-dimensional dispenser housing comprises a removable top closure exposing a top opening in a storage hopper, which may be constructed from thin sheets of plastic material, having slanted walls leading to a restricted outlet above a small, bottomless drawer which slides and delivers a small measured quantity out of the front of the dispenser. The drawer is positioned below the outlet of the hopper and is caused to slide across a bottom plate by means of a control rod operated by a pivoting plate which is spring biased until contacted by a push rod manually operated from the top of the dispenser.

1 Claim, 4 Drawing Figures

DISPENSER FOR PARTICULATE MATERIAL IN MEASURED QUANTITIES

This application is a continuation of Ser. No. 06/310,608, filed 10/13/81, now abandoned.

BACKGROUND OF THE INVENTION

1. FIELD OF THE INVENTION

The field of the invention is dispensing and particularly the dispensing of granular or particulate material in measured quantities selectively by manual operation of a control device (pushbutton) which mechanically transfers a small portion of the material each time it is actuated.

2. PRIOR DISPENSING DEVICES

The prior dispensing devices include those disclosed in the following patents: U.S. Pat. Nos. 753,597; 1,968,641; 2,080,311; 3,185,190 and 3,276,637. The disclosures in these patents confirm that it is old to house and store particulate material, such as ground coffee or instant coffee, and to transfer the material in small measured quantities out of the dispenser. Indeed, U.S. Pat. No. 3,276,637 discloses such an arrangement but the mechanism for dispensing the measured quantities is different from the present one and it lacks the pushbutton or similar control which is believed to be a significant attraction to the sale of such a device. Likewise, the disclosures in the other patents cited herein lack the control and operation feature of a movable drawer or the like. It is believed that potential purchasers of such a device would be most interested in a feature of being able to place a cup, for example, in front of the device and operate the measured dispensing by means of a simple pushbutton or other manual control.

SUMMARY OF THE INVENTION

A dispenser for particulate material comprising a normally closed hopper for storing such things as ground coffee or instant coffee, a closure for the hopper which may be open to dump the entire hopper or refill same, a small bottomless drawer beneath the hopper sliding across a fixed bottom plate to receive and transfer a small measured quantity from the hopper to the front of the dispenser, and a control means for said drawer comprising a manually operated control on the dispenser actuated by hand to deliver a small measured quantity.

An object of the present invention is to deliver a small measured quantity of particulate or pulverized material such as instant coffee in response to the single actuation of a control member located on the dispenser and to repeat same in successive actuations.

Another object of the present device is to provide the control means in the aforementioned paragraph so as to include a pushbutton and a spring biased control means which will return each time to initial position for successive despensing.

Another advantage of the present device is to avoid and get away from the use of push-pull drawers such as found in the prior art and employ a positive control device such as a pushbutton on the dispenser for one-handed operation and so that the hand that controls the dispensing is not in the way of the cup.

Other and further objects and advantages of this invention will become apparent upon reading the following description of the preferred embodiment taken in conjunction with the accompanying drawings.

DESCRIPTION OF A PREFERRED EMBODIMENT

Figure 1:
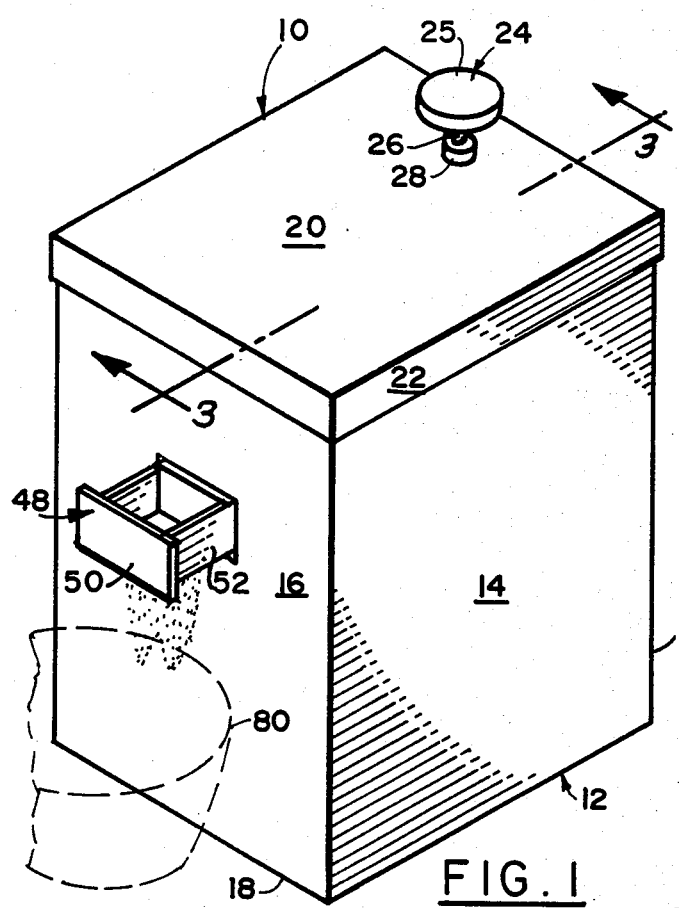
FIG. 1 is a perspective view of a preferred form of the dispenser.

The dispenser 10 shown in FIG. 1 comprises a three-dimensional, attractive housing 12 having sides 14, front 16, back 17, bottom 18 and a removable top closure 20 which has short peripheral sides 22 that fit around the top edge of the housing 12. The outside of the dispenser 10 may be decorated (not shown) such as by applying a pattern or other decoration to the sides 14, front 16 and back 17.

Figure 2:
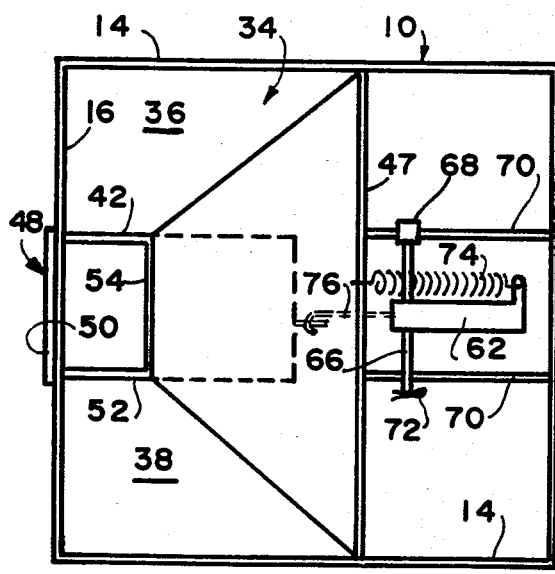
FIG. 2 is a top plan view of the dispenser shown in FIG. 1 with the top closure removed.

The top closure 20 may be lifted and removed thereby leaving the top of the housing 12 open in the manner shown in FIG. 2. Top closure 20 has a control means thereon in the form of a plunger 24 comprising a plunger shaft 26 mounted in a bearing 28 attached to the closure 20 and there is a spring 30 inside of the bearing 28 biasing the plunger to normal extended position as shown in FIG. 3.

Referring to FIG. 2, the inside of the housing 12 is constructed by means of sheet plastic or the like to form a storage hopper 34 comprising smooth inclined sides 36, 38 and an inclined back 40 converging at the bottom to a restricted exit opening 42. A substantially horizontal, fixed bottom plate 44 is mounted inside the housing 12 between the front wall 16, the rear wall 17 and the side walls 14 to provide a horizontal ledge part of which acts as the bottom to the sliding drawer 48 and the rest of which strengthens the interior of the dispenser 10. There is also an interior, vertical wall 49.

Figure 3:
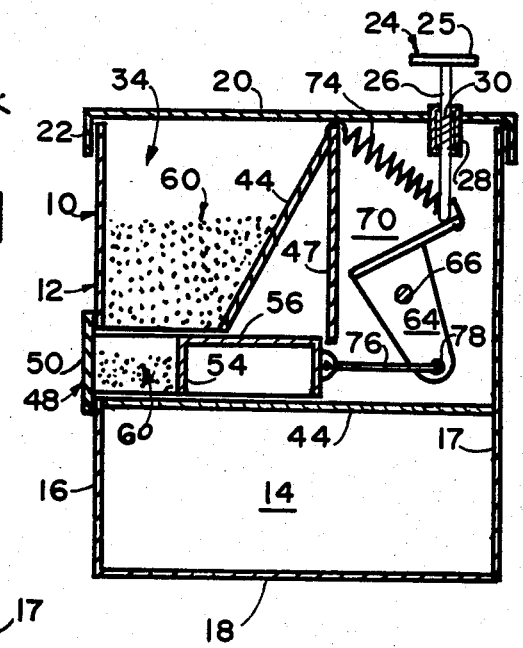
FIG. 3 is a cross-sectional view taken substantially along lines 3—3 in FIG. 1, with the dispensing drawer retracted in normal position.
Figure 4:
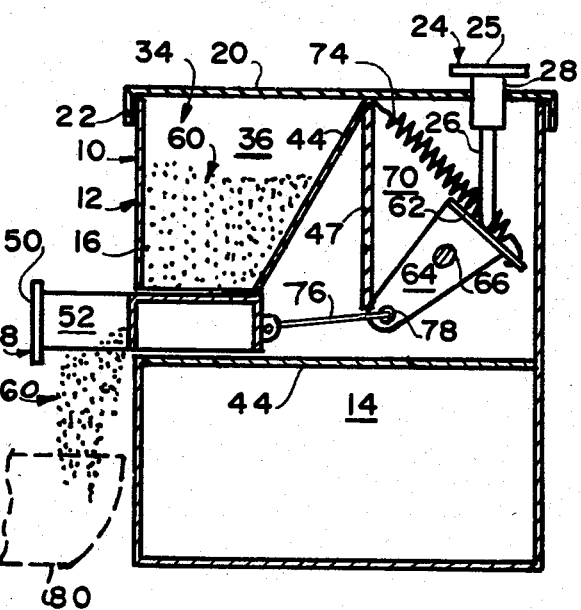
FIG. 4 is a cross-sectional view the same as FIG. 3 except that the control member has been depressed and the drawer is in full extended dispensing position.

The drawer 48 comprises a front 50, sides 52 and an end 54 but no top and no fixed bottom although the horizontal shelf 44 serves as the bottom for the drawer 48 as it moves from a normal retracted position shown in FIG. 3 to the dispensing position shown in FIG. 4. There is, a top 56 on the back part of the drawer 48 to cut off the flow of the particulate material 60, such as instant coffee, in the hopper 34 whenever the drawer 48 is extended to dispensing position shown in FIG. 4.

The movement of the drawer 48 from normal to dispensing position is accomplished by manually pushing the button 25 causing the plunger 24 to be depressed and move vertically against a shifting plate mechanism comprising a flat top plate 62 and a vertical plate 64 attached thereto and mounted on a transverse shaft 66 inserted through a bearing member 68 supported between walls 70. The shaft 66 is held in place by a kotter key 72. Plate 62 is spring biased to a normal upwardly extending position shown in FIG. 3 by means of a coil spring 74 having one end attached to plate 62 and the other end inserted over and hooked into a hole in the vertical wall 47. Plate 64 is attached to the drawer 48 by means of a control link 76 having one end in a hole 78 in plate 64 and the other end attached to the rear of drawer 48 so that when the shaft 26 is moved vertically from the position shown in FIG. 4, the plate 62 is contacted by the end of shaft 26 which causes the plate 64 to move about pivot 66 thereby moving control rod 76 substantially in a straight line pushing drawer 48 from the front wall 16 at the same time pushing the small quantity of material 60 which is trapped within the confines of the drawer 48 allowing it to fall into a cup 80. When the drawer 48 is released by releasing the control button 25, (which is assisted by spring 30) spring 74 returns the drawer to the position shown in FIG. 3 whereupon it receives another measured quantity of the material 60 through the opening 42 and is ready again to dispense and so on in successive dispensing operation as long as the hopper has a supply of material 60 therein.

With the present arrangement it is possible to make the entire dispenser 10 out of lightweight material.

While I have shown and described a particular embodiment of the invention together with a suggested mode of operation this is by way of illustration and there are various changes, alterations, deviations, revisions, departures and modifications which may be made in the disclosed embodiment without departing from the scope of the invention as defined only by a proper interpretation of the appended claims.

What is claimed:
1. In a dispensing device for particulate material:
   a three-dimensional housing comprising a storage hopper for storing and dispensing the particulate material, said hopper having a sloped interior and a dispensing outlet therein from which the particulate material may exit by gravity for dispensing a measured amount,
   a receptacle mounted for movement to reciprocate in straight extension and retraction beneath said hopper to receive a quantity of particulate material therein, said receptable having an open top to receive the material therein from said hopper outlet and an open bottom to dispense the material therefrom,
   a removable closure on said housing having a hole therein,
   means on said housing closing the bottom of said receptacle while in substantially retracted position beneath said hopper comprising a shelf member within said housing providing a bottom for said receptacle when in retracted, non-dispensing position,
   control means in said housing and rearwardly of said receptacle having a pivoting means and a means engaging said pivoting means with said receptacle,
   a plunger mounted in the hole in said closure, said plunger being movable vertically and having an unattached terminal contact and whereby said closure may be removed with said plunger therein without detaching said plunger, said pivoting means including a first portion contacted by and free of the unattached terminal end of said plunger and a shifting means comprising a portion depending therefrom for driving said receptacle in response to movement of said plunger to drive from a non-dispensing to a dispensing position,
   spaced first and second supports for said pivoting means,
   spring means normally biasing said receptacle to retracted position, said spring means resisting the movement of said pivoting means by said plunger and tending to return said receptacle to retracted position,
   said means engaging comprising a connecting means for engaging said second portion of said pivoting means with said receptacle.

* * * * *